United States Patent Office 2,862,880
Patented Dec. 2, 1958

2,862,880

METHOD OF CLARIFYING WATER BY HYDROPHOBIC POLYAMINES

Harry J. Clemens, Lyons, Ill., assignor to Armour and Company, Chicago, Ill., a corporation of Illinois No Drawing. Application July 27, 1954
Serial No. 446,155

8 Claims. (Cl. 210—52)

This invention relates to a method of clarifying water which is particularly applicable to the clarification of industrial waste water containing negatively-charged finely suspended and/or colloidal particles, such as foundry sand wash water. The method of this invention can also be advantageously used for other purposes.

Molding sands used in industrial foundries vary somewhat in composition but are essentially a quartz sand with a clay binder such as bentonite. In reclaiming of used foundry sand, one common practice involves the attrition scrubbing of the sand while washing it with water. Large quantities of water are required for this purpose, and the water after use contains high concentrations of colloidal silica and clay particles. This creates a problem in the disposal of such foundry sand wash water, which is similar to the disposal problem of other industrial waste water containing negatively-charged colloidal particles.

It is therefore a general object of this invention to provide a method of clarifying water containing suspended, negatively-charged particles, which method is particularly applicable to the clarification of foundry sand wash water, providing an inexpensive and rapid process for this purpose. Further objects and advantages will appear as the specification proceeds.

In one of its phases, this invention is concerned with treating foundry sand waste water or other turbid water containing negatively-charged particles with a polyamine compound having at least two amine groups and at least one hydrophobic group containing from 8 to 22 carbon atoms. Low concentrations of such compounds have been found to be surprisingly effective for this purpose, and to have a coagulating effect much greater than would have been expected. In another of its phases, this invention is concerned with the treatment of water containing negatively-charged colloidal particles by an inorganic coagulant agent such as aluminum sulfate in combination with a polyamine compound of the type just described. The inorganic coagulant and polyamine compound appear to act synergistically. Much less of each reagent is required than if used separately, and the floc or coagulated material has a different character than when either is used alone. Specifically, the floc settles faster, and is tougher or more stable. Further, the floc can be separated much more rapidly by filtration.

While the polyamine compounds described above are suitable for use in the method of this invention, it is preferred to employ a polyamine compound represented by the following type formula:

R—(NH—CH$_2$—CH$_2$—CH$_2$)$_x$—NH$_2$ wherein R is a hydrophobic group containing from 8 to 22 carbon atoms and X is an integer from 1 to 3. More specifically, R can be a hydrocarbon residue derived from a higher fatty acid or a rosin acid, or a mixture of such residues, such as saturated and unsaturated alkyl chains of from 8 to 22 carbon atoms and abietyl groups. These compounds can be used as such, but are preferably employed in the form of their water-soluble salts, such as their acetate, hydrochloride, and phosphate salts. Particularly good results have been obtained with N-tallow-trimethylene-diamine and N-tallow-ditrimethylene triamine in the form of their acetate salts. Other water soluble forms of the compounds can be used, such as their addition products with ethylene oxide or methyl chloride.

The desired concentration of the polyamine compounds for the purpose of this invention will vary with the solids concentration of the water being treated. Usually amounts of polyamines ranging from 1 to 10 grains per gallon of the water will exhibit a pronounced coagulating and clarifying action on the negatively-charged colloidal particles, and complete clarity can usually be obtained within this range. Lesser amounts of the polyamines can be used in combination with inorganic coagulants like aluminum sulfate.

Any of the well known inorganic coagulants can be advantageously used in combination with the polyamine compounds in accordance with the present invention. The common inorganic coagulants are the mineral acids and di- or tri-valent inorganic salts. Aluminum sulfate (alum) is a preferred reagent among others in the class of inorganic coagulants, which includes reagents like hydrochloric and sulphuric acid, ferrous sulfate, ferric chloride, and activated silica. As little as .25 to 2 grains of polyamine compound in combination with an inorganic coagulant like aluminum sulfate accelerates the rate of floc formation and the settling of the floc. The floc is also more stable, being less easily broken up, and can be filtered much more rapidly.

As indicated above, the method of this invention is particularly applicable to the treatment of foundry sand wash water. Such wash waters may contain from 2,000 to 50,000 p. p. m. of suspended clay and silica particles. More generally, the method of this invention is applicable for clarifying other types of water containing colloidal silica particles, or other negatively-charged particles. Even more generally, the compounds of this invention are found to promote the separation of suspended solid material from water by filtration, thus making them applicable to the separation of sewage treated by the activated sludge method in a water slurry. In these applications the method of this invention will involve the steps of employing the polyamine compound either alone or in combination with an inorganic coagulating agent, into the water containing the suspended solids, and thereafter removing the coagulated material from the water, preferably by filtration.

While the embodiments described above are preferred, this invention has a still broader aspect in which water containing suspended negatively-charged particles is treated by introducing into said water a polynitrogenous compound selected from the group consisting of (A) a compound having the general formula

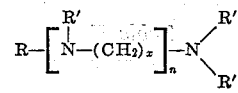

wherein R is a radical selected from the group consisting of (1) aliphatic hydrocarbon radicals having from 6 to 22 carbon atoms, (2) acyl derivatives of (1), and (3) rosinyl radicals; R' is a radical selected from the group consisting of (1) aliphatic hydrocarbon radicals having from 1 to 6 carbon atoms, (2) hydrogen, (3) hydroxyalkyl, and (4) polyalkoxyhydroxyalkyl; $x$ is an integer of from 2 to 10; and $n$ is an integer of from 1 to 4; (B) imidazoline forms of (A) when $n$ is greater than 1 and $x$ is 2 or 3; (C) partial quaternary forms of (A) and (B); (D) total quaternary forms of (A) and (B); and (E) water-soluble acid salts of (A) and (B).

The term "rosinyl radicals" as used herein is intended to include the radicals of rosin acids, e. g. abietyl radical from abietic acid, etc.

The method of this invention is further illustrated by the following specific examples.

EXAMPLE I

Two samples of used foundry sand were obtained. They represented the two main types of used sand. Sample #1 was from a steel foundry and sample #2 was from an iron foundry. The essential difference in the two samples, apart from the sand, was the nature of the binders which have been added by the foundries to make the cores and molds. These binder materials are essentially clay and bentonite, cereal bond, oil, resins, and silica flour. In sample #1 the quantity of bentonite used as a bonding material was relatively high; this is a normal practice in the steel foundries. Sample #2 contained little or no bentonite.

For one series of tests foundry sand wash water was prepared by scrubbing 3 pounds of the #1 used sand (screened at 8 mesh to remove metal particles) in a Fagergren flotation cell for 10 minutes with 1.8 liters of tap water. The above scrubbing was repeated twice more using new water. The washings were collected and diluted to 15 liters of total solution which was then screened at 325-mesh to remove particles coarser than 44 microns. The resulting wash water contained roughly 10,000 parts per million solids, determined by the evaporation of a sample. Water from sample #2, prepared in a similar manner, contained 8,000 p. p. m. solids. In the following tests 208 cc. of the above solutions were measured into beakers for each test and small amounts of dilute solutions of chemicals were added until complete flocculation was noted, and further additions were made in order to produce a clear solution if possible.

Following each reagent addition the solutions were stirred gently and allowed to stand until the condition of the floc and the clarity could be observed. Table I shows the results of the tests on the sample #1 wash water and Table II for the sample #2 wash water.

Table I

| Treating Agent | Amount of Chemical required for condition, lbs./1,000 gals. | |
|---|---|---|
| | Fully Flocced | Flocced and Solution Clear |
| N-dodecyl-trimethylenediamine monoacetate | 2.0 | 4.0 |
| N-tallow-trimethylenediamine diacetate | 1.5 | 2.0 |
| N-rosin-trimethylenediamine monoacetate | 3.0 | |
| N-tallow-trimethylenediammonium chloride | 1.0 | 1.5 |
| N-tallow-N (β-hydroxyethyl) N'-bis (β-hydroxyethyl) trimethylene-diamine | 1.0 | 1.5 |
| N-tallow-ditrimethylenetriamine triac | 1.0 | 1.0 |
| N-tall oil ¹-ditrimethylenetriamine triacetate | 1.0 | 1.5 |

¹ Mixture fatty and rosin groups from tall oil.

Table II

| Treating Agent | Amount of Chemical required for condition, lbs./1,000 gals. | |
|---|---|---|
| | Fully Flocced | Flocced and Solution Clear |
| N-tallow-trimethylenediamine diacetate | 1.0 | 1.5 |
| N-tallow-ditrimethylenetriamine triacetate | 0.5 | 1.0 |

EXAMPLE II

Industrial waters from a process for reclaiming used foundry sand contain a high percentage of colloidal contamination which is essentially bentonitic and siliceous fines. Actual waste water having 7,000 parts per million (p. p. m.) non-settable solids was treated with surface active amine products. The following data shows the results:

| Treating Agent | Amount of Coagulant to produce complete clarify, gr./gal. |
|---|---|
| N-tallow trimethylene diaminediacetate | 6.7 |
| N-tallow ditrimethylenetriaminetriacetate | 5.2 |
| N-tallow-N-(β-hydroxyethyl)-N'-bis (β-hydroxyethyl) trimethylenediamine | 4.9 |
| N-(R ¹)-trimethylene-diaminediacetate | 4.9 |
| N-(R ¹)-ditrimethylene triamine triacetate | 4.2 |

¹ (R) Mixtures of fatty and rosin groups (from tall oil source).

EXAMPLE III

Sewage treated by the activated sludge method consists of inorganic, fibrous (cellulose, etc.), and protein type material as a non-filterable slurry. High molecular weight polyamines were found to be adaptable as coagulants to promote filtration. Dilutions were made for comparison purposes. Activated sludge diluted to 0.2% solids was used in the filtration tests. 200 ml. of diluted sludge was treated with the agents shown—time in seconds to filter 150 ml. of treated sludge is indicated.

| Coagulant | Amount of Coagulant, grains per gal. sludge | Filtration Time, Seconds |
|---|---|---|
| Blank (Untreated) | No treatment | 170 |
| N-tallow trimethylenediaminediacetate | 3.7 | 51 |
| | 7.4 | 40 |
| N-tallow-ditrimethylenetriamine triacetate | 3.7 | 40 |
| | 7.4 | 35 |

EXAMPLE IV

Waste water from a process described in Example II was estimated to contain 3,000 p. p. m. colloidal solids. This water when treated to the floc points, pH 6.1 or pH 4.5, with aluminum sulfate (commercial alum) was only partially clarified, the resulting small floc settling slowly. This same water when treated with 7.0 grains of technical grade N-tallow-ditrimethylene-triamineacetate was completely clarified with the heavier floc settling quickly. A third sample of this water with pretreatment to a pH of 6.1 with alum required 4.2 grains of the triamine acetate to produce improved floc which settled rapidly. A fourth sample of waste water pretreated with alum to a pH of 4.5 required only 0.25 grain of the triamine acetate per gallon of water treated to produce the same rapid settling of the floc leaving a completely clear top layer.

EXAMPLE V

Siliceous slime water from a classification treatment of a non-magnetic taconite (iron ore) was measured to contain 5.5% solids (mostly slowly settlable or non-settlable). This water and samples of same which had been thickened to contain 20.0% fine solids, was treated with either sulphuric acid or N-tallow-ditrimethylenetriamine acetate for comparison of coagulant effect and filterability. The untreated 5.5% solids water (pH 8.1) on standing would clarify only slightly with a portion of the solids settling into a not-too-well defined layer. A sample of the raw water would filter to a moist cake in 70 seconds. The same water treated to a pH of 2.1 with sulphuric acid clarified only partially by the slow settling of the fine floc. This acid treated water filtered to a moist cake in 50 seconds. A sample of 5.5% solids water when treated with 3.0 grains of N-tallow-ditrimethylenetriamine acetate per gallon completely clarified with the floc settling rapidly into a well defined layer; this treated water filtered to a moist cake in 35 seconds.

The thickened slurry (20.0% solids) showed no indications of settling even on long standing. A sample of this raw water filtered to a moist cake in 350 seconds. Raw water treated to a pH to 2.4 with sulphuric acid showed no visual flocculation; filtration to a moist cake required 330 seconds. A sample of raw 20.0% solids water when treated with 11.8 grains of N-tallow-ditrimethylenetriamineacetate per gallon was completely flocced with immediate settling. The treated sample filtered in 165 seconds.

EXAMPLE VI

Waste water from a process of the type described in Example II was estimated to contain approximately 8,000 p. p. m. colloidal or fine-suspended (essentially siliceous) solids. After subjecting a sample of this untreated water to suction filtration for 5 minutes, only 165 ml. had filtered. Data below gives the application of amidoamine and imidazoline types of substituted polyamines as coagulants of siliceous or negatively-charged fine suspended material. In each test, 417 ml. of waste water was used.

| Treating Agent | Amount of Agent in Grains/Gal. to completely coagulate solids | Time to filter solids to moist cake using 14 grains/gal. of agent |
|---|---|---|
| | | Seconds |
| N-tallow-diethylene-triamine amidoamine acetate | 10.5 | 74 |
| N-tallow-tetraethylene-pentamine amidoamine acetate | 9.0 | 90 |
| N-lauryl-triethylenetetramine imidazoline acetate | 10.5 | 95 |
| N-tallow-diethylenetriamine imidazoline acetate | 14.0 | 92 |

While in the foregoing specification this invention has been described in relation to specific embodiments thereof and many details have been set forth for purpose of illustration, it will be apparent to those skilled in the art that the invention is susceptible to other embodiments and that many of the details set forth herein can be varied widely without departing from the basic concepts of the invention.

I claim:
1. The method of clarifying water containing a colloidal suspension of negatively-charged mineral particles, comprising introducing into said water a polyamine compound selected from the group consisting of the compounds and water-soluble salts thereof represented by the type formula:

$$R-(NH-CH_2-CH_2-CH_2)_x-NH_2$$

wherein R is a hydrophobic group containing from 8 to 22 carbon atoms and X is an integer from 1 to 3, said compound being introduced in a coagulating-concentration for said colloidal mineral particles, and thereafter removing the coagulated material.

2. The method of claim 1 in which the integer represented by X is 1.

3. The method of claim 1 in which said polyamine compound is an acetate salt of N-tallow-trimethylenediamine.

4. The method of claim 1 in which said polyamine compound is an acetate salt of N-tallow-ditrimethylenetriamine.

5. The method of claim 1 in which said polyamine compound is an acetate salt of N-rosin-trimethylenediamine.

6. The method of claim 1 in which said water is foundry sand wash water containing colloidal silica particles and in which said polyamine compound is added in a concentration of from 1 to 10 grains per gallon.

7. The method of claim 1 in which there is also introduced in said water an inorganic coagulant.

8. The method of claim 7 in which said inorganic coagulant is selected from the group consisting of aluminum sulfate, slaked lime, sulfuric acid, ferrous sulfate, ferric chloride, and hydrochloric acid.

References Cited in the file of this patent
UNITED STATES PATENTS

| | | |
|---|---|---|
| 1,847,212 | Feldenheimer | Mar. 1, 1932 |
| 2,104,728 | Bertsch et al. | Jan. 11, 1938 |
| 2,236,930 | Uytenbogaart | Apr. 1, 1941 |
| 2,347,576 | Ogilby | Apr. 25, 1944 |
| 2,368,596 | Johnston et al. | Jan. 30, 1945 |
| 2,601,597 | Daniel et al. | June 24, 1952 |
| 2,601,598 | Daniel et al. | June 24, 1952 |
| 2,666,527 | Peterson | Jan. 19, 1954 |
| 2,694,666 | Parfentjev | Nov. 16, 1954 |
| 2,694,702 | Jones | Nov. 16, 1954 |

OTHER REFERENCES

Ruehrwein et al.: Soil Science, vol. 73, No. 6, pp. 419 and 485–92, June 1952.

Lettré et al.: "On Polyvalent Quaternary Ammonium Compounds," 575, Annalen der Chemie, 18–28 (1952).